United States Patent
Zumbrunnen

(10) Patent No.: US 7,514,492 B2
(45) Date of Patent: Apr. 7, 2009

(54) COMPOSITES WITH ORIENTED PARTICLES AND PARTICLE NETWORKS WITH METHOD

(75) Inventor: David A. Zumbrunnen, Seneca, SC (US)

(73) Assignee: Clemson University, Clemson, SC (US)

(*) Notice: Subject to any disclaimer, the term of this patent is extended or adjusted under 35 U.S.C. 154(b) by 0 days.

(21) Appl. No.: 11/701,234

(22) Filed: Feb. 1, 2007

(65) Prior Publication Data

US 2007/0135553 A1    Jun. 14, 2007

Related U.S. Application Data

(62) Division of application No. 10/956,753, filed on Oct. 1, 2004, now abandoned.

(60) Provisional application No. 60/508,708, filed on Oct. 3, 2003.

(51) Int. Cl.
*C08K 9/04* (2006.01)

(52) U.S. Cl. .................. 524/445; 524/430; 524/495; 524/543

(58) Field of Classification Search ............... 524/445, 524/430, 495, 543
See application file for complete search history.

(56) References Cited

U.S. PATENT DOCUMENTS

| | | | | |
|---|---|---|---|---|
| 6,384,121 | B1 * | 5/2002 | Barbee et al. | 524/445 |
| 6,617,020 | B2 * | 9/2003 | Zhou et al. | 428/355 R |
| 6,770,340 | B2 | 8/2004 | Zumbrunnen et al. | |
| 6,902,805 | B2 | 6/2005 | Zumbrunnen et al. | |
| 7,377,684 | B2 | 5/2008 | Zumbrunnen | |
| 2005/0113503 | A1 | 5/2005 | Zumbrunnen | |
| 2007/0135553 | A1 | 6/2007 | Zumbrunnen | |

OTHER PUBLICATIONS

Hassan Aref, Stirring by Chaotic Advection, J. Fluid Mech. (1984), vol. 143, pp. 1-21, printed in Great Britain.

* cited by examiner

*Primary Examiner*—Robert D. Harlan
(74) *Attorney, Agent, or Firm*—Leydig, Voit & Mayer, Ltd.

(57) ABSTRACT

A method and types of composites in which particles are oriented within a melt-processable material or are arranged into networks in response to chaotic advection. A masterbatch comprising a melt-processable material and particles is supplied to a blender in which chaotic advection is maintained for a specified period. A second, melt-processable material may be supplied to the blender simultaneously. Resulting composites include extrusions with oriented inorganic platelets that reduce permeation or electrically conducting plastics and other functional materials.

18 Claims, 8 Drawing Sheets

403
402
400
401

411
412

423
424
421
422

FIGURE 7A
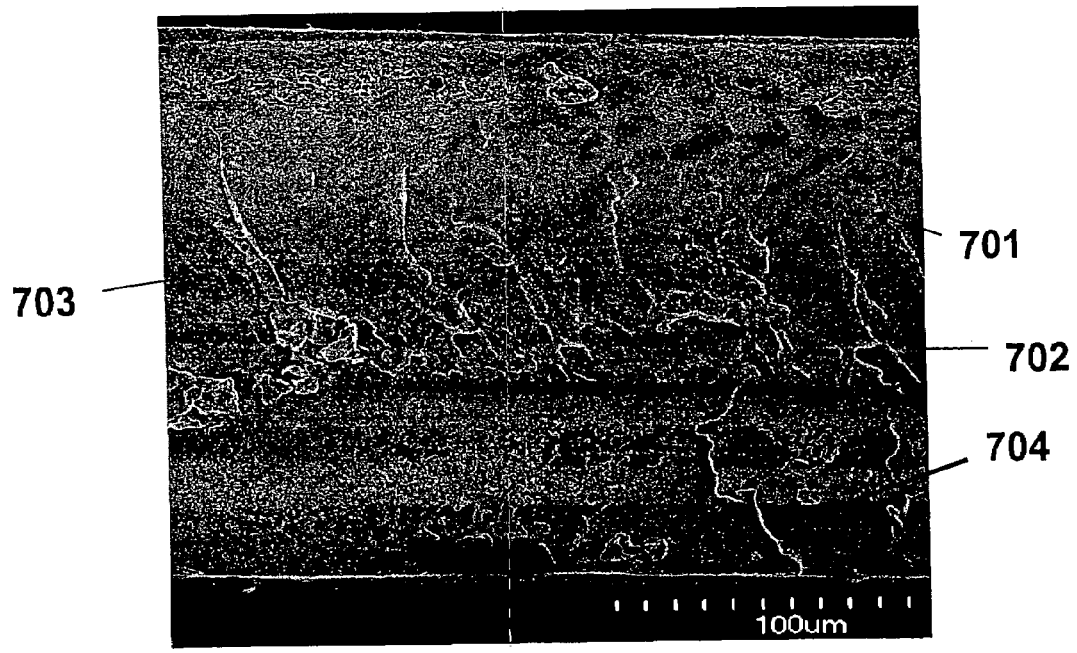
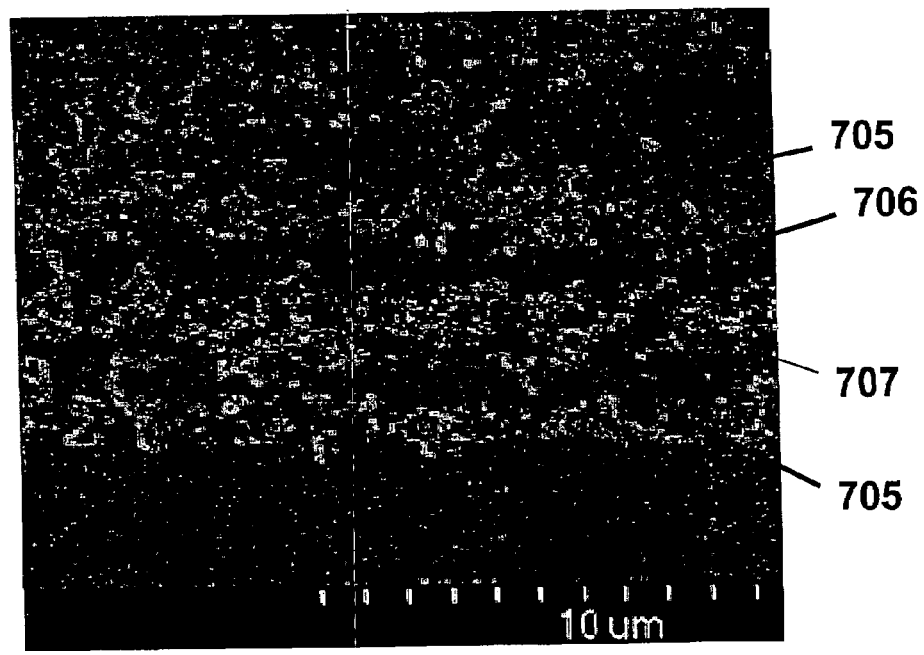
FIGURE 7B

COMPOSITES WITH ORIENTED PARTICLES AND PARTICLE NETWORKS WITH METHOD

RELATION TO PRIOR APPLICATIONS

This patent application is a divisional of U.S. patent application Ser. No. 10/956,753 filed Oct. 1, 2004 now abandoned, and as such divisional this application claims the benefit and priority of U.S. Provisional patent Application 60/508,708 filed Oct. 3, 2003 claimed by U.S. patent application Ser. No. 10/956,753 and hereby incorporated by reference in its entirety.

TECHNICAL FIELD

The invention involves plastic materials with particulate matter embedded in the plastic to form a composite or nanocomposite. The invention is fully applicable to other materials that are processable in a viscous, liquid-like state, such as glass. The invention describes composites, including nanocomposites with controllably oriented particles and interlocking networks that affect the physical properties of the composite including permeability, directional electrical conductivity, and mechanical strength. In addition, the invention describes smart blending technology derived from chaotic advection to controllably form the composite.

BACKGROUND

Plastics in their varied formulations and applications are effectively a part of nearly every element of modern commerce, science and technology. The development and use of polymer blends and composites represent a significant advance through which desired characteristics of two or more components may be combined in a single material.

Among the various methods available to produce plastic components, increased understanding of a new process of blending polymeric constituents of plastic composites has led to novel and improved composites and methods to produce them. Fundamental to one rapidly emerging process is the understanding that particles can be advected along complex paths in even simple flow fields, and the motion over time can become chaotic, a behavior known as chaotic advection, and, because of the newly discovered ability to control the in situ structure development, a process now referred to as smart blending. See U.S. Pat. No. 6,770,340 issued Aug. 3, 2004 to Zumbrunnen and U.S. patent application Ser. No. 10/385,118 (Zumbrunnen et al. filed Mar. 10, 2003), both of which are hereby incorporated by reference in their entirety.

SUMMARY OF THE INVENTION

A purpose of the invention is a composite that reduces gas permeability while retaining suitable characteristics for various types of food product packaging.

A parallel purpose of the invention is a composite that displays directional electrical conductivity. Plastic films with conductive capabilities may find wide and varied uses in the computer/electronic components and packaging industry.

Related purposes of the invention are methods to produce composites suitable for food packaging and methods to produce composites with controlled, directional electrical conductivity.

Additional related purposes include products with increased flexural rigidity and method to produce such products.

These and other goals and purposes of the invention are achieved by a method that controls of the distribution and orientation of particles in a composite and includes steps of selection of an appropriate melt-processable material and a particle, and processing the plastic and particle to yield a master batch, and subsequently processing the master batch utilizing a blender that will instill chaotic advection and after feeding the master batch into the blender, operating the blender for a time to instill chaotic advection, discharging the composite, and processing it into a product; these goals and purposes are further achieved by a composite with oriented particles that increases gas permeability resistance of the composite, a composite with oriented particles that imparts directional electrical conductivity, and a composite with oriented particles that increases the strength of the composite; these goals and purposes are further achieved by method to produce composites with oriented particles by first producing a master batch from a selected, melt-processable material and a particle introducing the master batch to device capable of inducing chaotic advection concurrently introducing to the device a second, melt-processable material, and operating the device to induce chaotic advection for a specified period of time discharging the resulting composite, and processing it for use; these goals and objectives are further achieved by a method of producing a composite in which particles included in a master batch form interconnecting networks that are separated into layers when the master batch is concurrently subjected to chaotic advection with a second, melt-processable material.

BRIEF DESCRIPTION OF THE FIGURES

FIG. 7A is a micrograph illustrating organization of carbon black particles into networks in an extruded plastic in response to chaotic advection.

FIG. 7B provides details on the organization of FIG. 7A.

EXAMPLES

Overview

Chaotic advection conditions can be accomplished by batch and continuous devices. A continuous flow, smart blender has proved to be very useful in the formation of a variety of composites and provides a basis for explaining smart blending devices and the chaotic advection process as it relates to the production of certain composites.

As used herein with respect to particles, the term clay is used in a broad sense and includes clay in addition to similar, inorganic material that subdivides into small, discrete, flat particles, including, but not limited to graphite and silica. Clay and such other materials are capable of being oriented in composites by chaotic advection. Similarly, the term carbon black with respect to particles is used in a broad sense and includes carbon black as well as other conductive materials in a powder-like form that may form clusters including, but not limited to nickel, iron, and copper. Carbon black and such other particulate materials are capable of forming interconnecting networks in composites by chaotic advection. Particles can vary in size from microns to nanometers.

Melt-processable materials include, but are not limited to nylon, polypropylene, polypropylene-g-maleic anhydride, and linear, low density polyethylene. Additional melt-processable materials include for example other plastics and glass.

Figure 1:
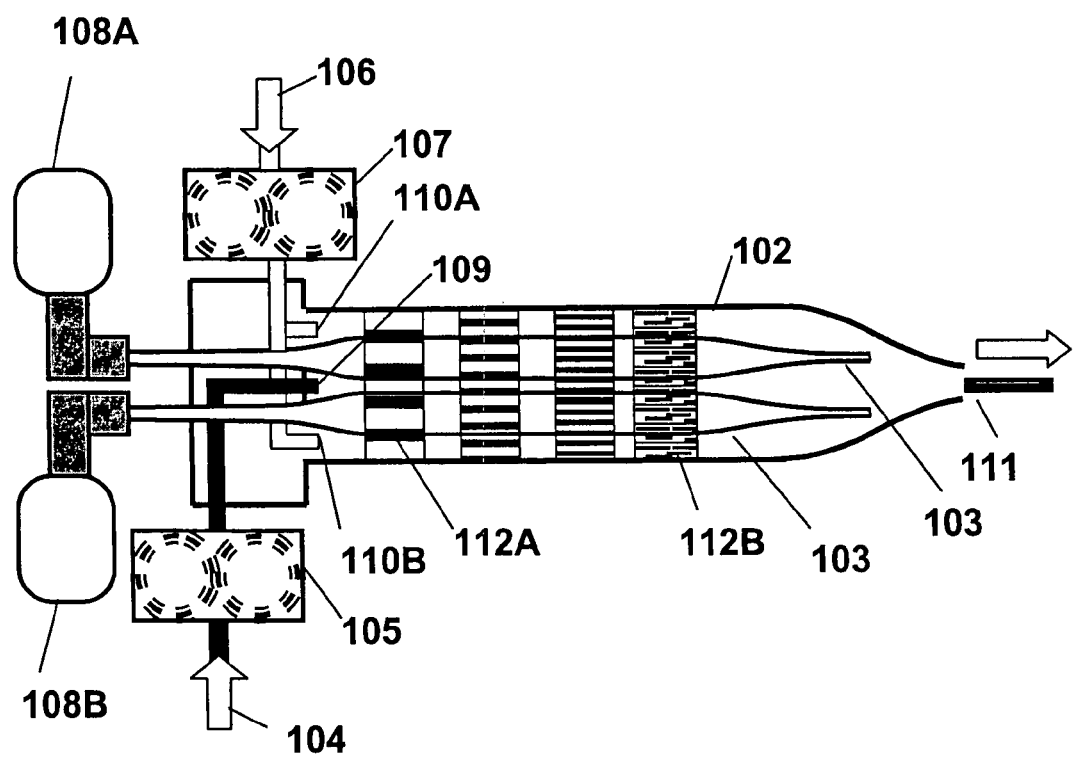
FIG. 1 is a schematic diagram of a continuous flow smart blender capable of inducing chaotic advection.

FIG. 1 illustrates the major components of a twin-rod, continuous flow smart blender device. The device 101, in a generalized, simplified configuration, comprises a barrel 102 in which conditions for chaotic advection are established and maintained. Twin stir rods 103 are positioned in the barrel. These rods 103 rotate independently, but in the same direction to instill chaotic advection. The number of rotations of the rods and the time a melt-processable material remains in the barrel (the residence time) form the basis of the extent of the chaotic advection to which the material is exposed.

Composites comprise at least two components (or melts). Commonly the more prevalent material is designated the major component (or melt), and the other, the minor component. In this invention, the major component may be a master batch comprised of a melt-processable material plus a particle material (such as clay or carbon black). There is no required, second melt-processable material, although composites with particles with and without a second, melt-processable material can be used.

The device 101 illustrates a first flow (melt-processable material) 104 being delivered via a first metering pump 105 to the barrel 102. The second flow (melt-processable material) 106 is similarly delivered by a second metering pump 107 to the barrel 102. The stir rods 103 are driven by independent motors units 108A and 108B. Rotation of the stir rods is a major factor in inducing chaotic advection. By rotating the rods sequentially and periodically and with adequate rotational displacement, chaotic advection arises.

In FIG. 1, the first flow (melt-processable material) 104 is represented by the dark segments, and it is introduced at a single point 109. The second flow (melt-processable material) 106 is indicated by light segments and introduced at two points 110A and 110B. In general, any number of introduction points can be used. The materials move through the barrel 102 and the composite is discharged at the distill end of the barrel 111. The impact of chaotic advection on progressive structuring of the composite is suggested by the simple arrangement of the two materials near the points of entry (109 and 110A and 110B) of the material compared with the more extensive structuring near the discharge point 111 as suggested by the arrangements of dark and light segments; compare 112A with 112B. Materials at the input points have been exposed to relatively little chaotic advection, and as a result the structure of the evolving composite is initially coarser as suggested by the simple arrangement of light and dark bars at 112A. During the time the material passes from the entry points 109 and 110A and 110B, the material undergoes greater exposure to chaotic advection, and as a result a more complex and fine-scale structure evolves, as suggested by the arrangement of the light and dark bars 112B, near the distill end 111 discharge point.

The process of chaotic advection is characterized by recursive stretching and folding of compounds in a fluid-like state. When generally immiscible plastics or plastic-like materials are processed, the resulting composite may develop characteristic encapsulates as a function of the degree of exposure to chaotic advection.

When a master batch comprising a melt-processable material and particles is subjected to chaotic advection, the particles may become oriented in the melt-processable material (as is the case with clay), or form inter-connecting networks (as is the case with carbon black). The degree of orientation or network formation and interconnectivity among particles depends on the degree of chaotic advection to which the master batch is exposed.

In an alternative example, a second, melt-processable material may be introduced to the smart blender separately from but simultaneously with a master batch (a melt-processable material plus particles). See FIG. 1. In such examples, the particles either are oriented or form networks in the melt-processable material of the master batch, and the second, melt-processable material exists as alternating layers of material, effectively free of the particles. This allows, for example, production of a composite with nano-scale layers that are alternately electrical conductive and non-conductive, or composites with many internal layers having aligned platelets for low permeation plastic materials. This layered organization is found even when the second, melt-processable material is the same material as the melt-processable material of the master batch.

The extent of particle orientation and particle network characteristics in a melt and processing time are related to the number (N) of chaotic advection periods. One period can comprise the separate and sequential rotation of individual stir rods that can be rotated in the same direction. Perturbation strength (u) equals the fraction of a complete rotation for each rod during one period. In the following examples, in which the continuous chaotic advection blender was used, unless otherwise noted, u=3.0. Chaotic advection was induced by the rotation of stir rods. In a preferred configuration (embodiment), rods were rotated by separate stepper motors independently controlled by a computer interface.

Example 1

The addition of inorganic materials to plastic with appropriate processing yields plastic material with high barrier properties suitable for many food packaging applications. Clay is a suitable source of particulate material having very thin platelets (approximately 1 nm) and having high frontal area with low mass diffusively. See Okada, et al., 1997.

Figure 2:
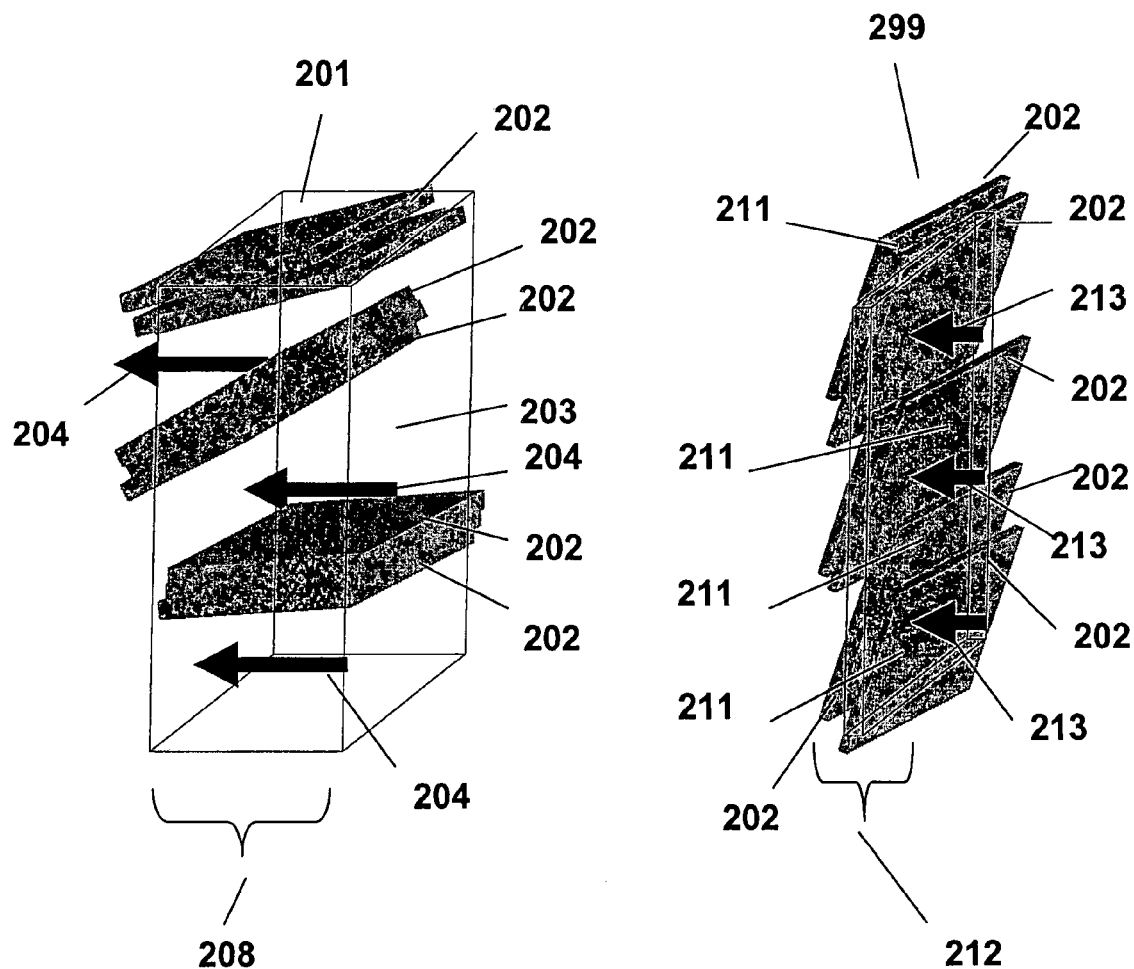
FIG. 2 diagrammatically illustrates the orientation of clay particles in plastic in response to chaotic advection.

FIG. 2 illustrates how molecular diffusion is impeded by orientation of clay particles in response to smart blending based on the processes of chaotic advection. In conventional mixing 201 the clay platelets 202 are scattered essentially at random and are not oriented throughout the volume of the plastic 203 in which they are suspended. This lack of orientation results in the persistence of numerous paths indicated by arrows 204 for permeation to occur. Conditions that tend to yield an organized pattern 299 of the platelets with the frontal dimension 211 of the clay plates 202 aligned in a common, or nearby plane resist diffusion by blocking openings, arrows 213, compared with the nonoriented material 201. In addition, the thickness 212 of the material with oriented platelets 299 is marked less than the thickness 308 of the non-oriented, control material. The relatively thin materials that can result are important in many packaging applications. Moreover, oriented clay particles can be provided within several distinct regions in a plastic, such as within parallel layers to impart greater resistance to permeation, for example. Mechanical properties such as flexural rigidity (stiffness) can also be improved by plate orientation.

Figure 3:
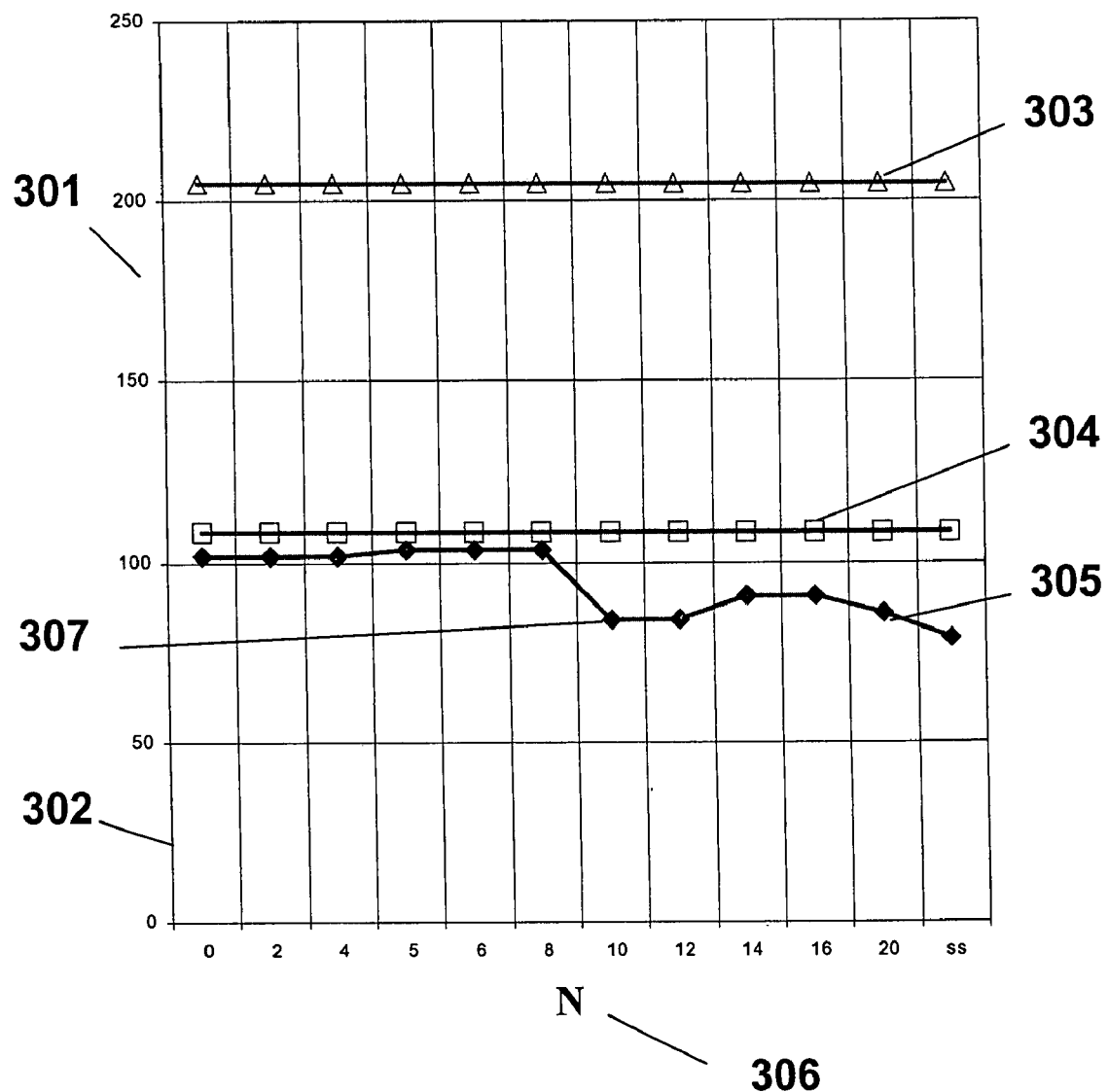
FIG. 3 shows the effectiveness of oriented clay particles in reducing the oxygen permeability in polypropylene-clay composites and also the oxygen permeability of pure polypropylene.

FIG. 3 illustrates both the effect of the inclusion of clay particles within a plastic and the effects of the extent of blending of a mixture of plastic and clay particles of oxygen permeability 301 indicated on the vertical axis 302 in units of cc.mil/100 in$^2$ day for the control, pure polypropylene, PP, 303, for PP with clay particles added and conventionally blended by twin screw extruder process 304 and for PP with clay particles added 305 and the mixture subject to various degree of chaotic advection reflected by N 306, a parameter related to stir rod motion in the smart blender, which ranges here from N=0 to N=22 on the horizontal axis 306

The obvious effect of the inclusion of the oriented clay particles on permeability is seen in the comparison of the PP 303 and with the PP and clay not subjected to smart blending 304 and the PP with clay particles subjected to smart blending 305. Clay particle orientation occurs as N increases. Clearly the presence of clay reduces permeability. The reduction in permeability resulting with blending, greater than N=8 306, demonstrates the impact of the chaotic advection process on orienting the platelets thereby pinching paths for diffusion.

Figure 4A:
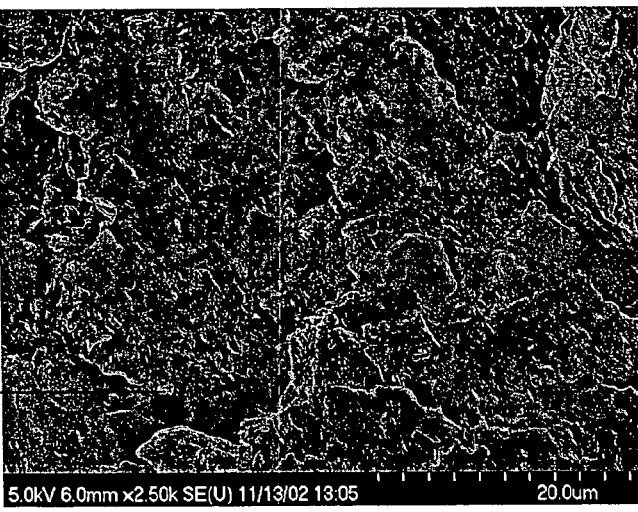
FIG. 4A illustrates a composite of clay and polypropylene that has been subjected to conventional mixing in a twin screw extruder and thereby lacks orientation in the clay particles.
Figure 4B:
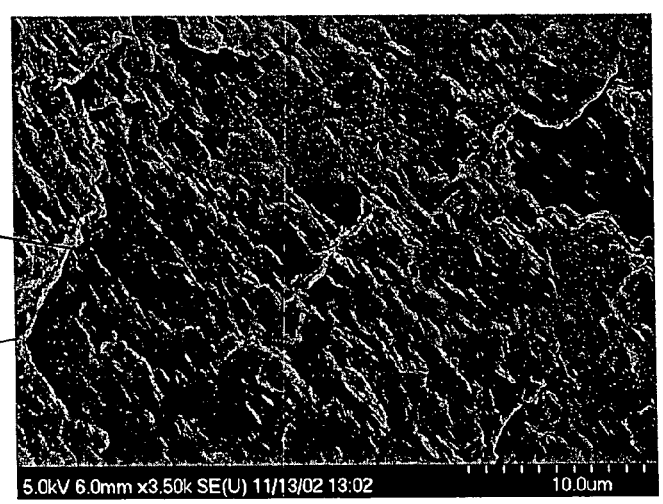
FIG. 4B illustrates the effects of chaotic advection to orient clay particles on the masterbatch also used for FIG. 4A.
Figure 4C:
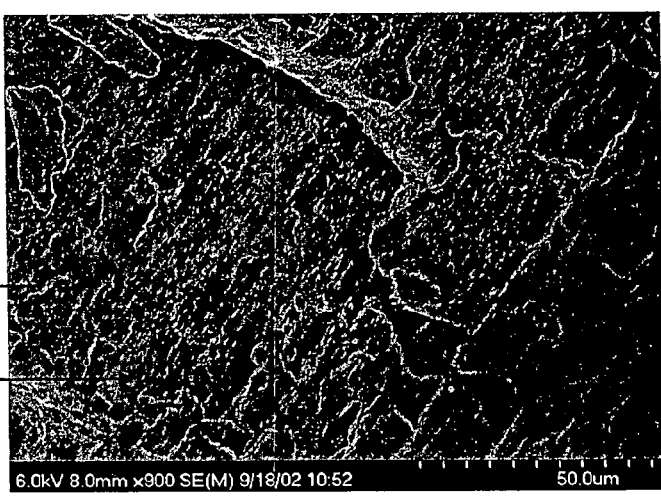
FIG. 4C illustrates an alternate composite in which clay particles are concentrated and oriented within layers adjacent to layers of the host plastic.

FIGS. 4A, B, and C illustrate structural arrangement of clay particles suspended in PP in response to blending. The corresponding properties are given in FIG. 3 and the related discussion. Two different starting materials were used. FIGS. 4A and 4B illustrate responses to blending using a masterbatch comprising 6% clay, 89% PP, and 5% PP-g-MA. FIG. 4C illustrates responses to blending in which PP was injected as melt-processable material (104 of FIG. 1) in a proportion of 62.5% by volume and the remaining 37.5% was a masterbatch injected as a melt-processable material (106 FIG. 1) comprising 15% clay, 72.5% PP, and 12.5% PP-g-MA. The PP-g-MA of FIGS. 4A, B, and C acts to exfoliate the clay, and other than this effect on particle size, it has no direct effect on particle orientation in response to blending. The masterbatch was prepared in a twin screw extruder and extruded and pelletized before smart blending at approximately 200 C.

In FIG. 4A, the composite produced by a twin-screw extruder from the masterbatch illustrates the lack of orientation that results from conventional mixing. The composite 400 has clay particles 402 randomly distributed throughout the PP 403. FIG. 4B illustrates the effects of chaotic advection, N=8, on the orientation and distribution of clay particles 411 in the PP 412 matrix. Comparing the organization of the clay particles in FIGS. 4A and 4B illustrates the effects of smart blending on the composite. The orientation of the clay platelets in FIG. 4B compared with the lack of organization evident in FIG. 4A illustrates how the clay platelets are oriented with face area in the same plane, thereby reducing gas diffusion through the plastic, or improving flexural rigidity.

FIG. 4C illustrates an alternate structure where clay particles are oriented and concentrated by chaotic advection, N=20 within multiple layers. The structure includes layers containing oriented particles 421 separated by layers of PP 422. The particles 423 are organized in a parallel configuration 424. The extensive organization illustrated in FIG. 4C, is a result of supplying PP and a masterbatch (FIG. 4A) as the other component as melt streams 104 and 106.

Blending for the masterbatches of FIG. 4A and the novel composites of FIGS. 4B and 4C was done at 200 C.

Example 2

The inclusion of particles of electrically conductive material in a composite subjected to various levels of smart blending affects the directional conductivity of the composite. Carbon black, CB, may be used as the conductor particle. One skilled in the art recognizes that the phenomenon associated with CB in the composite will be produced by similar conductors including, but not limited to nickel powder, which conductors are included in the scope of the invention. An important, unique property is particles that are oriented or placed into networks in a continuous chaotic advection process are retained in a predictable orientation or network configuration in the extrusion.

Figure 5:
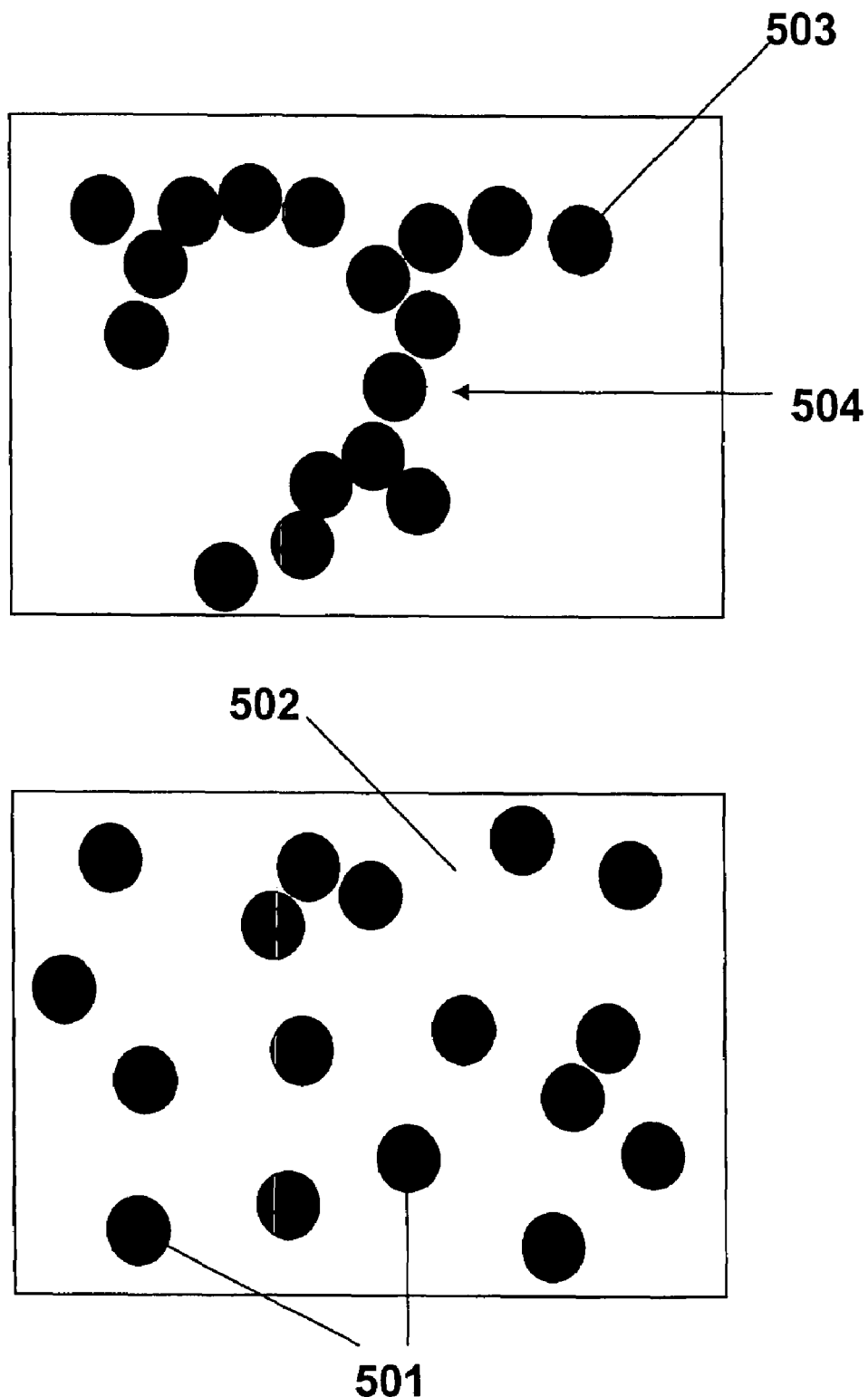
FIG. 5 compares randomly distributed carbon particles to those formed into a network in a plastic resulting from chaotic advection.

FIG. 5 illustrates the typical distribution of CB particles 501 in a plastic 502 subjected to conventional mixing contrasted with the distribution of carbon black particles 503 in the same type of plastic 502 following exposure to chaotic advection. The CB particles 503 form characteristic, predictable networks 504 in response to chaotic advection.

Figure 6A:
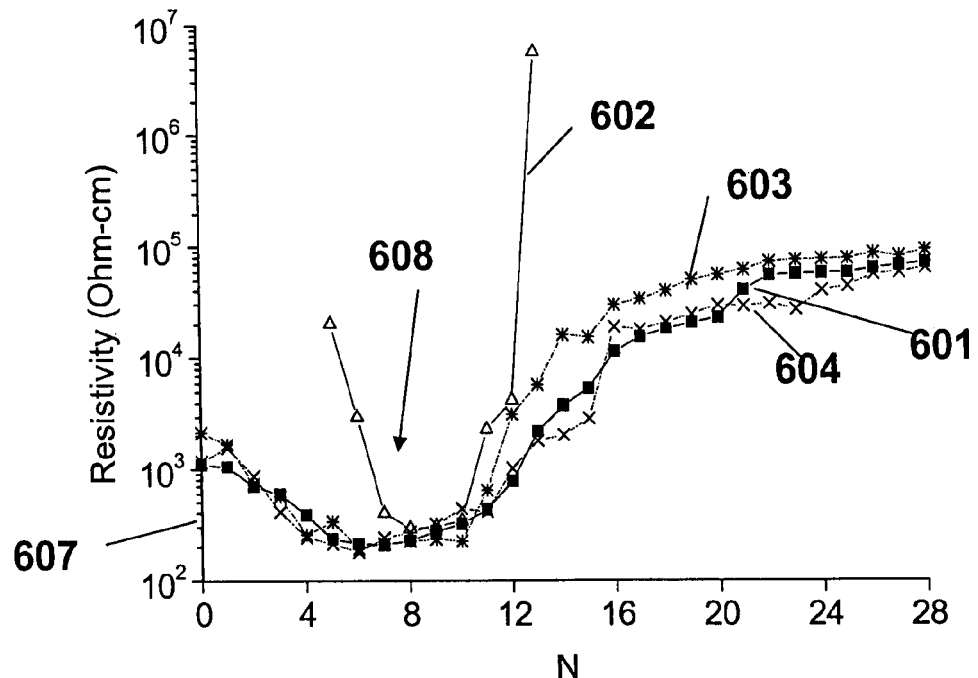
FIG. 6A illustrates ability to impart directional conductivities expressed in an extruded plastic with carbon black added in response to the extent of chaotic advection.
Figure 6B:
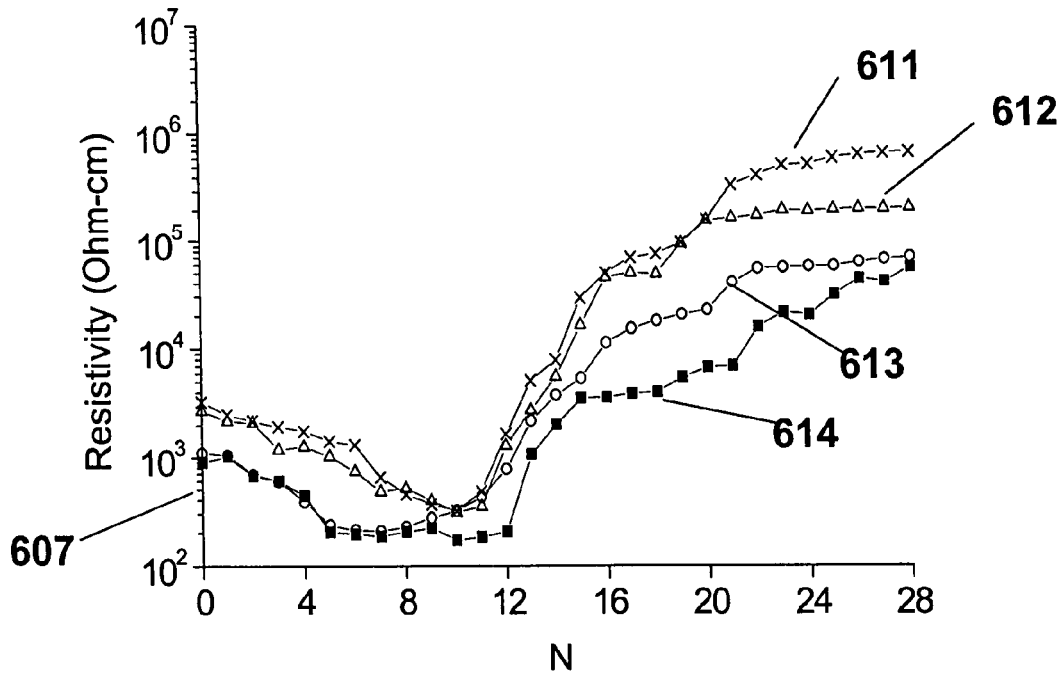
FIG. 6B illustrates impact of amount of carbon black on conductivity of an extruded plastic in response to the extent of chaotic advection.

The organized distribution of carbon CB in the composite affects a variety of directional electrical properties of extruded composite films, FIGS. 6A and 6B. Conductivity, measured by resistivity 607, of the composite film for machine (extrusion) direction 601, cross (or transverse) direction of the composite 602, left side of the film in machine direction 603, right side of the film in the machine direction 604, are illustrated in FIG. 6A for smart blending conditions 606 ranging effectively from N=0 to extreme blending, N=28. The general pattern 607 illustrated for all measures is similar with resistance higher (measured as Ohm-cm) for no blending (N=0) to smaller for increased blending (N=8) and higher for substantial blending (N=12 to N=28). This pattern of percolation and a novel reverse percolation provide potential composites with specific restivities, directional resistivities, and resistivity dependency. The most dramatic pattern 608 is apparent in the transverse (side to side) dimension of the film, demonstrating that differing directional resistivities can be imparted to extrusions via selection of a value of N when operating a smart blender.

Resistivity is affected less by percent CB in the composite than by the degree of blending, due in great part to the effects of the networks formed. FIG. 7B illustrates the response of four composites with CB weight concentration of 1.5% 611, 2.0% 612, 2.5% 613 and 3.0% 614 with each composites subjected to blending from N=0 to extreme blending N=28. Resistivity is indicated on the vertical axis 615 and the extent of chaotic advection (N) on the horizontal axis 616. Generally, the highest percent CB 614 resulted in the lowest resistivity 615. As apparent in FIG. 6B, for amounts of CB ranging from 1.5% to 3.0%, the highest resistance is at N=28. As in FIG. 6A, resistivity attains constant values at the largest N. This occurs because structured features formed by chaotic advection are similar in size to the CB particles so networks become indistinguishable from random distributions (501 FIG. 5). Such composites resemble and have properties similar to those resulting from conventional mixing. For the low CB concentrations in FIGS. 6A and 6B, with conventional mixing, only non-conducting composites are attainable, i.e., those having a high resistivity. In contrast, any of the directional resistivity values are attainable by chaotic advection by selection of N.

The arrangements of CB particles into networks and connecting branches which instill directional electrical properties are illustrated in FIG. 7A. By controlling the smart blending process in terms of N and selecting CB concentrations, the extent of interconnection among forming networks can be controlled to selectively impart directional electrical properties as in FIG. 7A. The carbon black particles 701 suspended in the plastic 702 reveal clear networks 703. The larger structures 704 are fractures resulting from sample preparation for microscopic study and are not part of the composite. FIG. 7B is an exploded (10×-increase) view of the composite of FIG. 7A. Interconnections among networks 705 by particles 706 are visible. The interconnecting particles of the carbon black and parallel networks 707 are the basis for the observed low resistivity and directional resistivities. The composites of FIGS. 7A and 7B included 3% by weight carbon black (Printex XE-II, Degussa, Inc., Akron, Ohio) suspended in linear low-density polyethylene (LLDPE Dowlex2517, Dow Chemical Company, Midland, Mich).

Similar results were achieved with carbon black concentrations of about 1.5% to about 6.5% by weight. Processing temperatures ranged from about 175 C to 220 C. Film edges of extruded films from the smart blender were removed before resistivity measurements were done in accordance with standard procedures.

Example 3

Figure 8:
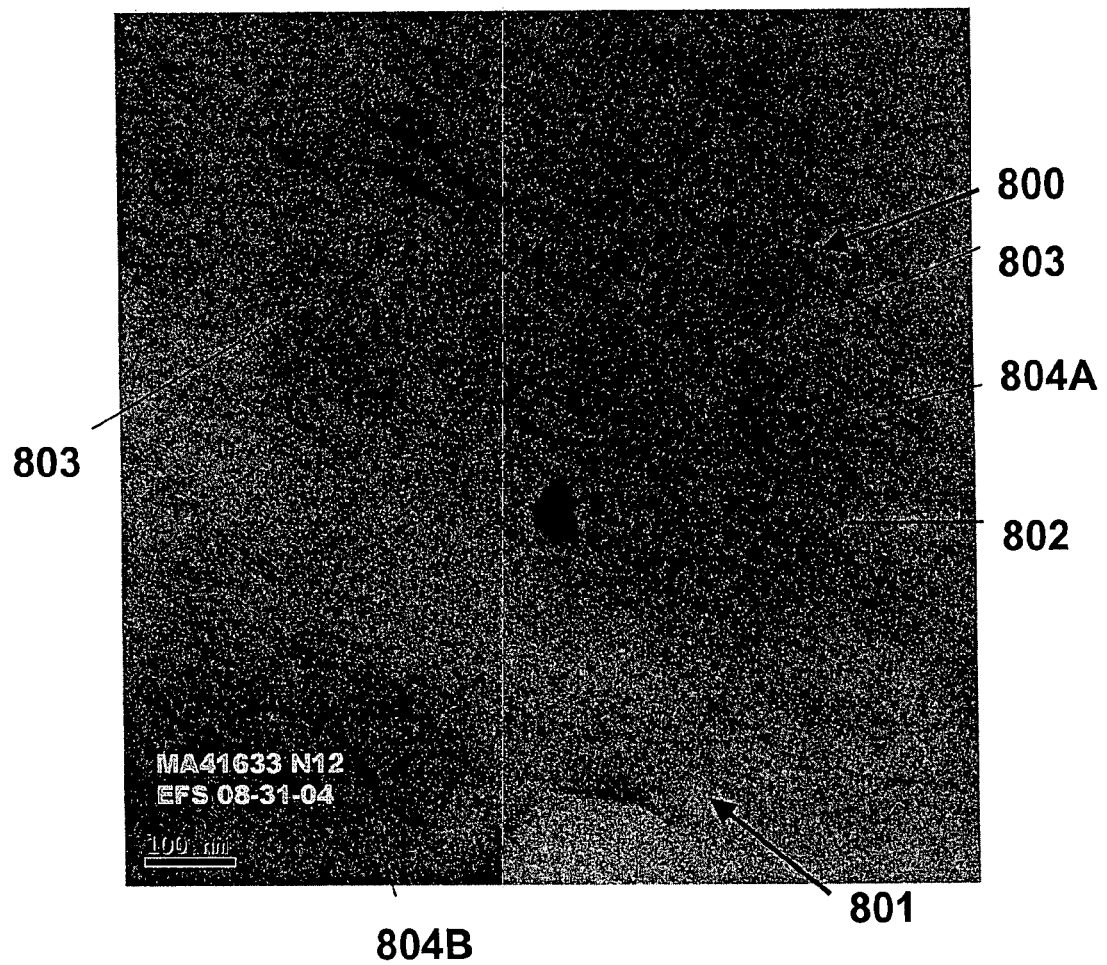
FIG. 8 illustrates orientation in a nanocomposite of clay nano-platelets in a master batch in which nylon is the melt-processable material and also adjacent layers of a second melt-processable material.

FIG. 8 illustrates a nanocomposite 800 with oriented clay particles 803 in a nylon master batch 802 arranged and oriented in numerous, discrete layers 804A and 804B separated by a layer 801 of the second melt-processable material, which also is nylon. The nylon/clay particle masterbatch, with a clay concentration of 4% by weight and nylon second melt-processable material were introduced in equal proportions into a chaotic advection device as described in association with FIG. 1. The nanocomposite was extruded as 150 micron thick films so several hundred similar internal layers existed. The illustrated composite is the product of chaotic advection with N=12.

Example 4

As one skilled in the art recognizes, the basic properties and technology described in Example 1 and Example 3, above, also affect thermal properties of composites. It is widely recognized that similarities in transport mechanisms for electrical conductivity and thermal conductivity exist. The addition of inorganic materials, such as clay particles and the organization generated by the application of smart blending technology yields composites with characteristic and useful thermal transfer properties not expressed in those plastics having random distribution of particles typical conventional mixing methods. Increased stiffness and strength of the material is a widely recognized, additional property resulting from the addition of clay.

In the interest of clarity and precision, specific terms and conditions have been presented in the figures and examples. Such limited terms and conditions are used to aid in understanding and to appreciate more fully the scope and intent of the invention, and not as limitations in the interpretation of the following, appended claims which are applications to particles having similar processing characteristics.

What I claim is:

1. A method to produce a composite with controllably oriented particles comprising:
    providing a masterbatch including a melt-processable material in combination with a particulate material comprising a plurality of particles;
    subjecting said masterbatch to chaotic advection of a specific duration within a blending device so as to cause said particles to orient in specific arrays in the resultant composite material, said chaotic advection being characterized by recursive stretching and folding of said masterbatch;
    discharging said composite from said blending device; and
    processing said resultant composite for use in the manufacture of a product.

2. The method of claim 1 wherein said melt-processable material is polyethylene.

3. The method of claim 1 wherein said particles comprise a low permeation material characterized by a substantially flat, plate-like, morphology.

4. The method of claim 3 wherein said low permeation material is a clay.

5. The method of claim 3 wherein said low permeation material is a graphite.

6. The method of claim 1 wherein said particulate material is an electrical conducting material comprising plate-like particles or particle clusters.

7. The method of claim 6 wherein said electrical conducting material is carbon black.

8. The method of claim 6 where said electrical conducting material is a metal.

9. A method of producing a composite with controllably oriented particles comprising the steps of:
    providing a masterbatch including a first melt-processable material in combination with a particulate material comprising a plurality of particles;
    selecting a second melt-processable material;
    feeding said masterbatch and said second melt-processable material simultaneously into a blending device adapted to apply chaotic advection to contents within said blending device;
    subjecting said masterbatch and said second melt-processable material to a defined amount of chaotic advection within said blending device to produce a composite with said particles oriented in a defined manner, said chaotic advection being characterized by recursive stretching and folding of said masterbatch and said second melt-processable material;
    discharging the resultant composite from said blending device; and processing said discharged composite for a use.

10. A method of producing networks among particles to yield a composite with unique features comprising the steps of:
    providing a masterbatch including a first melt-processable material in combination with a particulate material comprising a plurality of particles;
    selecting a second melt-processable material;
    feeding said masterbatch and said second melt-processable material simultaneously into a blending device adapted to apply chaotic advection to contents within said blending device;
    subjecting said masterbatch and said second melt-processable material to chaotic advection to a degree to produce a composite with networks formed among particles, said chaotic advection being characterized by recursive stretching and folding of said masterbatch and said second melt-processable material;

discharging the resultant composite from machine; and processing said discharged composite for use.

11. The method of claim 10 wherein said composite is characterized by directional electrical conductivity.

12. The method of claim 10 wherein said composite is characterized by electrical conductivity attained at particle concentrations as low as 1%.

13. The method of claim 1 wherein said particles are characterized by a substantially flat plate-like morphology.

14. The method of claim 9 wherein said particles are characterized by a substantially flat plate-like morphology.

15. The method of claim 10 wherein said particles are characterized by a substantially flat plate-like morphology.

16. A composite formed by the method as recited in claim 1.

17. A composite formed by the method as recited in claim 9.

18. A composite formed by the method as recited in claim 10.

* * * * *